United States Patent
Olsson

(10) Patent No.: US 11,153,832 B2
(45) Date of Patent: Oct. 19, 2021

(54) ADAPTIVE MICROWAVE COMMUNICATION LINK

(71) Applicant: Telefonaktiebolaget LM Ericsson (publ), Stockholm (SE)

(72) Inventor: Bengt-Erik Olsson, Mountain Lakese, NJ (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 200 days.

(21) Appl. No.: 16/086,818

(22) PCT Filed: Mar. 24, 2016

(86) PCT No.: PCT/EP2016/056624
§ 371 (c)(1),
(2) Date: Sep. 20, 2018

(87) PCT Pub. No.: WO2017/162299
PCT Pub. Date: Sep. 28, 2017

(65) Prior Publication Data
US 2019/0104481 A1   Apr. 4, 2019

(51) Int. Cl.
*H04W 52/24* (2009.01)
*H04W 28/08* (2009.01)
(Continued)

(52) U.S. Cl.
CPC ......... *H04W 52/241* (2013.01); *H04L 47/125* (2013.01); *H04W 28/08* (2013.01);
(Continued)

(58) Field of Classification Search
CPC .......... H04B 1/62; H04L 1/006; H04L 5/003; H04L 27/0002; H04L 29/06; H04L 29/10;
(Continued)

(56) References Cited

U.S. PATENT DOCUMENTS 8,331,461 B2   12/2012   Wegener
9,020,070 B2   4/2015    Bellot et al.
(Continued)

FOREIGN PATENT DOCUMENTS

EP   2852113 A1   3/2015
WO   WO-2015094256 A1 *  6/2015   .......... H04W 72/046

OTHER PUBLICATIONS

International Search Report and Written Opinion of the International Searching Authority, PCT/EP2016/056624, dated Jul. 20, 2016, 9 pages.

*Primary Examiner* — Marsha D Banks Harold
*Assistant Examiner* — Dharmesh J Patel
(74) *Attorney, Agent, or Firm* — Sage Patent Group

(57) ABSTRACT

A wireless communication link arrangement may include a first network device and a second network device. The wireless communication link arrangement is arranged for transfer of fronthaul data between these network devices via a wireless communication fronthaul link. Each of said network devices is arranged to constitute a transmitting network device and/or a receiving network device, and at least one network device is arranged to determine the present load on the wireless communication link arrangement. When the present load is determined to exceed a first threshold, at least one network device comprised in the wireless communication link arrangement, is arranged to determine whether data blocks that are intended to be transmitted by a transmitting network device contain information or not, and to instruct said transmitting network device to only transmit data blocks that have been determined to contain information.

17 Claims, 5 Drawing Sheets

(51) Int. Cl.
*H04L 12/803* (2013.01)
*H04W 52/34* (2009.01)
*H04W 52/36* (2009.01)
*H04W 72/04* (2009.01)

(52) U.S. Cl.
CPC ....... *H04W 52/343* (2013.01); *H04W 52/365* (2013.01); *H04W 72/0453* (2013.01)

(58) Field of Classification Search
CPC .. H04L 47/125; H04W 28/08; H04W 52/241; H04W 52/343; H04W 52/365; H04W 72/0413; H04W 72/0453; H04W 88/085
See application file for complete search history.

(56) References Cited

U.S. PATENT DOCUMENTS

| | | | |
|---|---|---|---|
| 2013/0088961 A1* | 4/2013 | Ramachandran | H04L 47/125 370/235 |
| 2014/0185428 A1 | 7/2014 | Thibeault et al. | |
| 2015/0017992 A1* | 1/2015 | Kwon | H04W 72/082 455/437 |
| 2015/0271256 A1 | 9/2015 | Pathak et al. | |

\* cited by examiner

ADAPTIVE MICROWAVE COMMUNICATION LINK

CROSS REFERENCE TO RELATED APPLICATIONS

This application is a 35 U.S.C. § 371 national stage application of PCT International Application No. PCT/EP2016/056624 filed on Mar. 24, 2016, the disclosure and content of which is incorporated by reference herein in its entirety.

TECHNICAL FIELD

The present disclosure relates to a wireless communication link arrangement comprising a first network device and a second network device. The wireless communication link arrangement is arranged for transfer of fronthaul data between the first network device and the second network device via a wireless communication fronthaul link.

BACKGROUND

Modern mobile data access systems often use simple remote radios units (RRU) connected to centralized base band processing units called eNodeB that are arranged to process transmitted and received radio signals from the RRUs. The communication format used for transmitting signals between the RRU and the eNodeB is usually the standardized common radio interface (CPRI) that allows digital transmission of the analog signals between the RRU and user equipment (UE). The communication network between the eNodeB and the RRUs is referred to as fronthaul, while the communication between the eNodeB and an evolved packet core (EPC) router is referred to as backhaul.

In a mobile access network, UE:s are arranged to connect to one more RRU:s that are arranged feed the complex signal as communicated with the UE to the eNodeB by means of the fronthaul network. The eNodeB can use one or more RRU:s to communicate with the UE:s and is arranged to assemble UE data, which UE data is further communicated with the EPC over the backhaul network, carrying only the actual bits communicated with the UE. The EPC is further connected to a core network such as the Internet.

Since the fronthaul network must accommodate the full amplitude and phase information of the signal communicated between the UE and the eNodeB, the bandwidth of the digitalized version of the signal becomes much larger than the actual bandwidth used between the RRU and the UE.

In many deployment scenarios, each RRU site covers several geographical sectors. This can be accomplished by using several RRUs or a single RRU unit with multiple antennas. Each sector requires a fronthaul connection to the eNodeB, and instead of having multiple fronthaul connections in parallel, fronthaul data from one RRU is aggregated together with fronthaul data from other RRUs, often in a daisy chain.

Typically, the standardized protocol common public radio interface (CPRI) is used for communication between RRU and eNodeB, and since CPRI supports multiple antenna signals in one CPRI stream, fronthaul data from RRU:s at different physical units can subsequently be aggregated. However, since each antenna sector generates a relatively large bandwidth, aggregating multiple sectors requires a relatively large capacity in the fronthaul link.

Most fronthaul links are accomplished by using optical fibers that easily supports the required bandwidth but in order to simplify deployment and lower cost, wireless fronthaul links wireless CPRI transport would be very attractive due to a potentially lower cost and quicker deployment. Currently, CPRI adds extensive excess bandwidth compared to the transmitted radio channel bandwidth, which makes it difficult to transmit over a wireless channel, such as a microwave link. Another problem is the time varying nature of a wireless radio channel due to environmental effect such as rain and air layering that can lead temporary increase in attenuation and multi-path fading. Since CPRI requires constant data rate, the use of adaptive modulation is not possible.

High capacity fronthaul links are possible using mm-wave radio links, but only allow short transmission distances, require large spectrum and become fairly expensive. There exist more spectrally efficient implementations by using non-CPRI data over the wireless link, for example by keeping the radio access (RA) technology modulation format over the wireless fronthaul link using signals for long term evolution (LTE) or wide band code division multiple access (WCDMA). Then the RA signals are simply up-converted to an appropriate microwave frequency and possibly corrected for impairments such as phase noise and frequency drift. This gives much better spectral efficiency since only the actual bandwidth of the RA signal plus some additional management data and synchronization signals are needed over the fronthaul link.

Adaptivity to changes in the fronthaul air link is maintained by the RA system. In case of e.g. rain over the fronthaul link, the signal-to-noise-ratio (SNR) of the RA signal will be lower and for very low SNR, the RA system will eventually lower the capacity for affected users. In the same way; if selective fading occurs, The RA system will adjust the useful bandwidth accordingly. However, this concept requires additional management link since the full CPRI information is not maintained.

Similarly, U.S. Pat. No. 9,020,070 discloses a system that separates management and RA (Radio Access) payload and the latter is transmitted as an analog signal over the fronthaul link while the management traffic is transmitted as pure digital symbols.

U.S. Pat. No. 8,331,461 discloses a method that compresses I/Q samples before transmitting over a fronthaul link with the purpose of reducing the total capacity requirements of the fronthaul link. However, compression does not solve the scaling issue from aggregation.

The document US 2013088961 relates to load balancing cable modems across channels of a load balancing group on a DOCSIS network. At least one Quality of Service (QoS) parameter is collected for each service flow from cable modems and used to identify at least one cable modem having a service flow with an inferior grade of the QoS parameter relative to a pre-defined threshold of the QoS parameter.

A general problem with fronthaul links is that the link essentially forwards a replica of the received and transmitted antenna signal for each antenna in the remote node regardless of what kind of signals present. Each antenna adds capacity requirements on the fronthaul link and the capacity grows linearly with the number of antennas.

There is thus a need for a more efficient wireless communication link arrangement arranged for transfer of fronthaul data.

SUMMARY

It is an object of the present disclosure to provide a more efficient wireless communication link arrangement arranged for transfer of fronthaul data.

This object is obtained by means of a wireless communication link arrangement comprising a first network device and a second network device. The wireless communication link arrangement is arranged for transfer of fronthaul data between the first network device and the second network device via a wireless communication fronthaul link where each of said network devices is arranged to constitute a transmitting network device and/or a receiving network device. At least one network device is arranged to determine the present load on the wireless communication link arrangement. When the present load is determined to exceed a first threshold, at least one network device comprised in the wireless communication link arrangement is arranged to determine whether data blocks that are intended to be transmitted by a transmitting network device contain information or not. This network device is also arranged to instruct said transmitting network device to only transmit data blocks that have been determined to contain information.

This object is also obtained by means of a method for adaptively maintaining a wireless communication fronthaul link that is used for transfer of fronthaul data between a first network device and a second network device, where the method comprises:

Determining the present load on the wireless communication link.

Determining if the present load exceeds a first threshold; and if that is the case:

Determining whether data blocks that are intended to be transmitted contain information or not.

Transmitting only data blocks that have been determined to contain information.

A number of advantages are obtained by means of the present disclosure. Mainly, a wireless communication link arrangement can be dimensioned according to realistic traffic rather than according to peak traffic.

According to an example, at least one of said network devices is arranged to determine that a data block contains information if it has a power level that is determined to exceed a second threshold.

According to another example, at least one of said network devices is arranged to determine whether a data block contains information by acquiring information from another network device in the wireless communication link arrangement regarding which data blocks that are intended to carry information.

In this manner it may become less complicated to determine whether a useful signal is present in a resource element or not.

According to another example, at least one of said network devices is arranged to determine whether a data block contains information by acquiring information from another network device regarding present data traffic conditions.

According to another example, the data blocks are in the form of resource elements. A plurality of resource elements may be comprised in a resource block, and a plurality of resource blocks may be comprised in a radio frame.

Other example are disclose in the dependent claims.

BRIEF DESCRIPTION OF THE DRAWINGS

The present disclosure will now be described more in detail with reference to the appended drawings, where.

DETAILED DESCRIPTION

Figure 1:
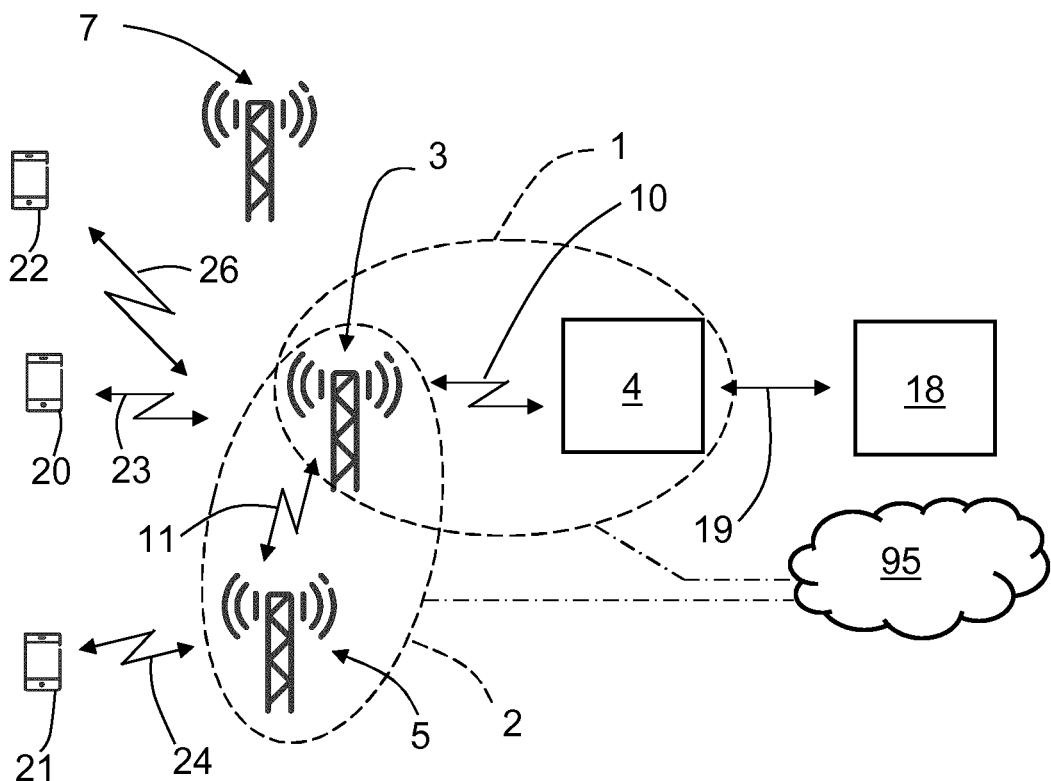
FIG. 1 shows a schematic view of a wireless communication link arrangement.

With reference to FIG. 1 there is a first wireless communication link arrangement 1 comprising a first node 3 and a second node 4 where the first node 3 is in the form of a remote radio unit (RRU) and where the second node 4 is in the form of an eNodeB, a centralized base band processing unit. The first wireless communication link arrangement 1 is arranged for transfer of digital data, more specifically fronthaul data, between the first node 3 and the second node 4 via a first wireless communication link 10 that is in the form of a fronthaul link. The eNodeB 4 is arranged to communicate with an Evolved Packet Core (EPC) 18 via a backhaul link 19.

As shown, there is a plurality of user terminals 20, 21, 22, each constituted by a user equipment (UE); in this example a first UE 20, a second UE 21 and a third UE 22. Each UE 20, 21, 22 is arranged to communicate with the first node 3 and a third node 5, in this example a first RRU 3 and a second RRU 5, via corresponding wireless communication links 23, 24, 26, in this example a second wireless communication link 23 between the first UE 20 and the first RRU 3, a third wireless communication link 24 between the second UE 21 and the second RRU 5, and a fourth wireless communication link 26 between the third UE 22 and the first RRU 3. All these wireless communication link 23, 24, 26 are in the form of a fronthaul links. A further simplified node 7 will be discussed later.

There is also a second wireless communication link arrangement 2 that is arranged for transfer of fronthaul data between the first node 3 and the third node 5 via a second wireless communication link 11. The second wireless communication link arrangement 2 more or less corresponds to the first wireless communication link arrangement 1; here however there is a wireless communication link 11 in the form of a fronthaul link between two RRU:s, the first RRU 3 and the second RRU 5.

Figure 2:
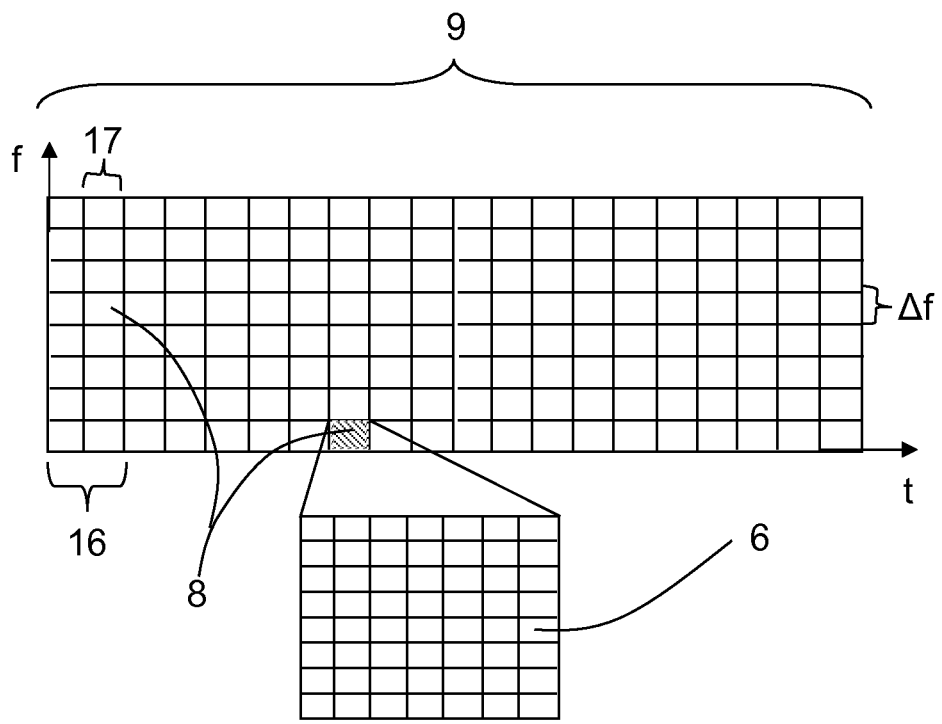
FIG. 2 shows a schematic view of a radio frame and resource element.

With reference also to FIG. 2, where there is time t on the x-axis and frequency f on the y-axis, data transmissions such as by means of for example LTE (Long Term evolution) are encapsulated in radio frames 9 that are divided into sub frames 16 where each sub frame 16 in turn is divided two slots 17. The frequency domain is also divided into groups where a smallest granularity has a certain block frequency span Δf. One slot 17 having a block frequency span Δf is called a resource block 8 and is the smallest entity that can be assigned to a user, for example in an LTE based access system. The resource block 8 is further split into several smaller resource elements 6. In LTE, both downlink and uplink use the same granularity, but the downlink uses OFDM (Orthogonal Frequency-Division Multiplexing) with twelve subcarriers in a resource block and the uplink uses SC-FDMA (Single Carrier Frequency Division Multiple Access).

The first node 3 is arranged to determine the present load on the wireless communication link arrangement 1. According to the present disclosure, when the present load is determined to exceed a first threshold, The first node 3 is arranged to determine whether resource elements 6 that are intended to be transmitted by the first node contain information or not, and to only transmit resource elements 6 that have been determined to contain information.

Figure 3:
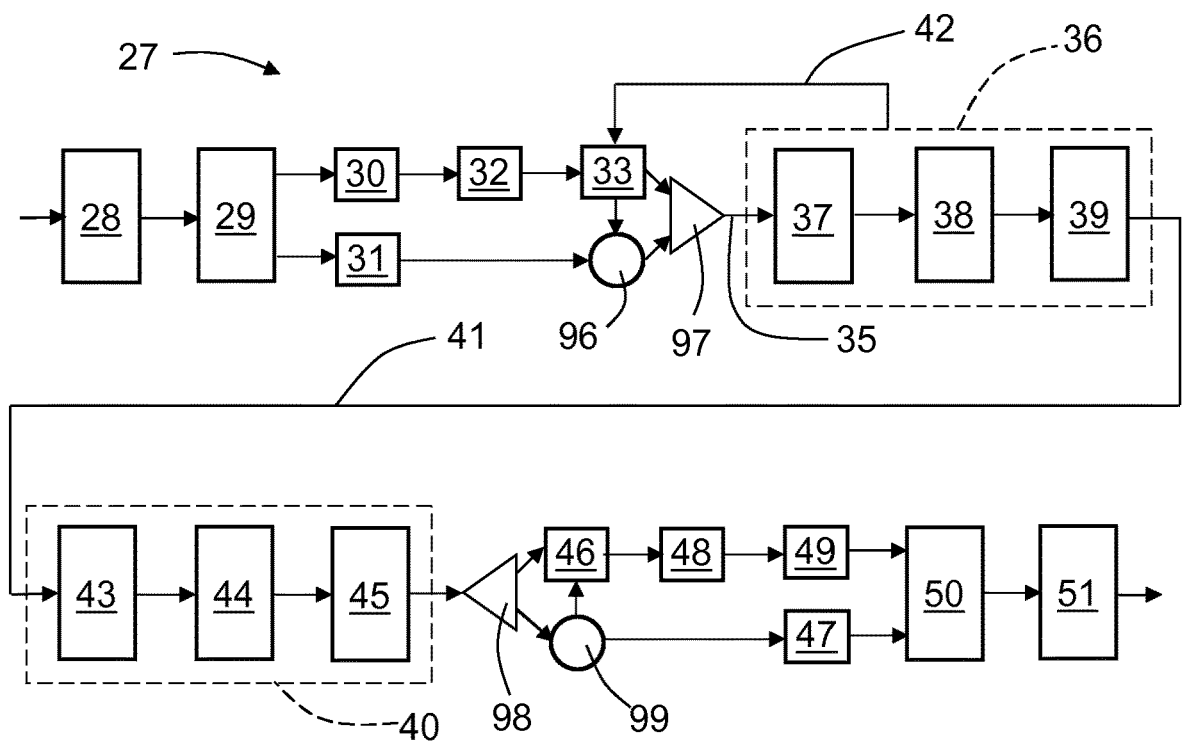
FIG. 3 shows a block diagram of a CPRI-based aggregating adaptive fronthaul link arrangement.

FIG. 3 shows a block diagram of a CPRI (common public radio interface)-based aggregating adaptive fronthaul link arrangement 27 used for LTE (Long-Term Evolution). With reference also to FIG. 3, a CPRI receiver 28 forwards received data to a first CPRI management device 29. The data is then divided and forwarded to both a first I/Q-sample device 30 producing I/Q samples, being arranged to extract I/Q samples from CPRI data, and a first O&M (Operation and Management) device 31 that outputs O&M data. In this way, O&M data are separated from I/Q sample data.

The I/Q samples are forwarded to an FFT (Fast Fourier transform) device 32 which is arrange to forward the Fourier transformed I/Q data to an element selector device 33. The element selector device 33 is arranged to select the resource elements that contain sufficient signal power and to transmit the corresponding samples and leave out the empty ones. The element selector device 33 adds information to the O&M data regarding resource elements that are forwarded at an information adding unit 96.

The O&M data and I/Q sample data that are to be transmitted from are multiplexed in a first multiplexing unit 97 such that a multiplexed information signal 35 is forwarded to a first link device 36 that comprises a coding/mapping device 37, a digital to analogue converter (DAC) 38 and a first link antenna device 39. The first link device 36 is arranged to communicate with a second link device 40 via a fronthaul link 41. The first link device 36 is arranged to feed a capacity indication 42 to the element selector device 33.

The second link device 40 comprises a second link antenna device 43, an analogue to digital converter (ADC) 44 and a slicer/decoder device 45. The output of the second link device 40 is separated into I/Q sample data and O&M data by means of a second multiplexing unit 97. The I/Q data are forwarded to an element restoring device 46 and the O&M data are forwarded to a second O&M device 47. A list of empty resource elements are co-transmitted from the first link device 36 to the second link device 40 in the O&M data, where this list is separated from the O&M data in an information separation unit 99 and forwarded to the element restoring device 46. This enables the element restoring device 46 to restore the complete resource block 8 as it was originally injected to the first link device 36. In this way, only resource elements containing information is forwarded over the fronthaul link 41.

In the above example, any type of multiplexing units or similar may be used. Furthermore, the O&M channel may be implemented in many ways, but most importantly the list of empty resource elements has to be forwarded via the fronthaul link 41.

The output of the element restoring device 46 is transformed in an inverse fast Fourier transform (IFFT) device 48 and sampled in a second I/Q sample device 49. The outputs of the second I/Q sample device 49 and the second O&M device 47 are combined in a second CPRI management device 50 and then forwarded by a CPRI transmitter 51.

All radio access (RA) channels are here separated from the incoming CPRI data and the resource blocks 8 in each radio frame 9 is extracted using the IFFT device 48 to extract the resource elements 6 actually used. Samples that belong to used resource elements are forwarded over the fronthaul link 41 while the resource elements not used, i.e. have total power below a certain threshold level, are not forwarded.

Together with the I/Q sample data, a description of which resource elements that were forwarded must also be sent to the other side, from the first link device 36 second link device 40. The resource element matrix is restored in the restoring device 46 using the description data together with the forwarded samples and the empty resource elements are filled with zero samples that were not forwarded over the fronthaul link 41.

By design, the link capacity should be suitable for typical traffic load, but if the available capacity of the link arrangement 27 is not sufficient to transport the number of used resource elements, some resource elements have to be dropped and replaced by zero samples at the receiver end. From channel state information (CSI) measurements, the LTE system will see this as frequency-selective fading. Different strategies can be applied in order to minimize the impact on the RA capacity during these events.

According to some aspects, in order to further reduce the capacity requirements in the fronthaul link 41, resource elements that contain static reference signals and synchronization signals are also left out by the element selector device 33 provided that they can be put back at the receiver side after being transmitted.

The functionality of FIG. 3 is reciprocal, i.e. works both ways such that the second link device 40 is arranged to transmit data to the first link device 36 in a similar way by means of corresponding devices (not shown).

Figure 4:
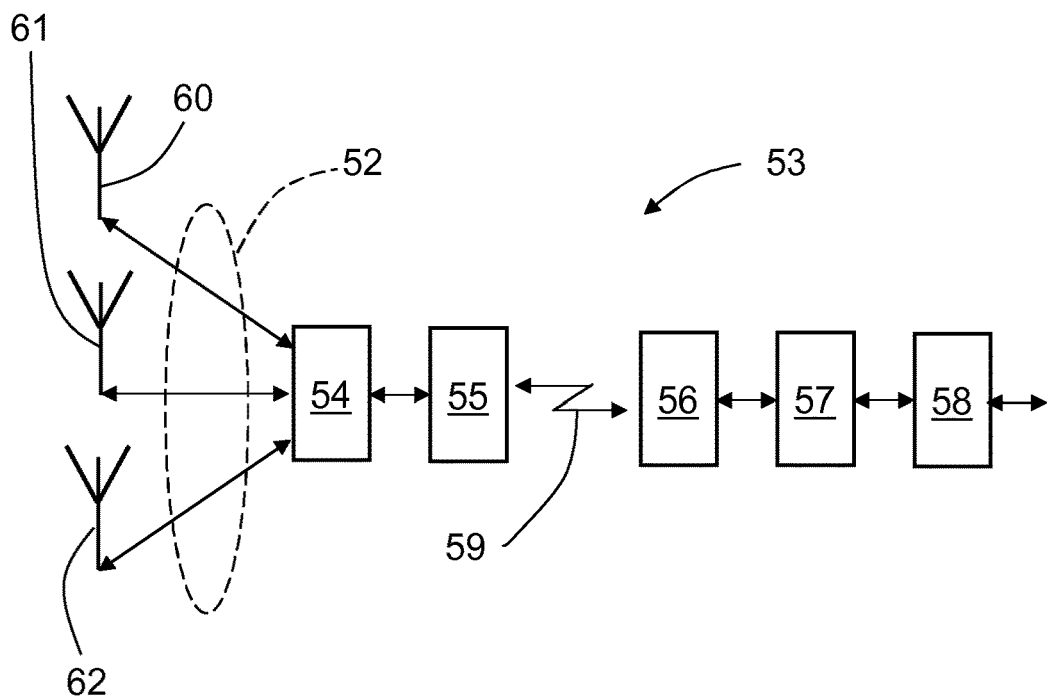
FIG. 4 shows a block diagram of a first application of fronthaul aggregation.
Figure 5:
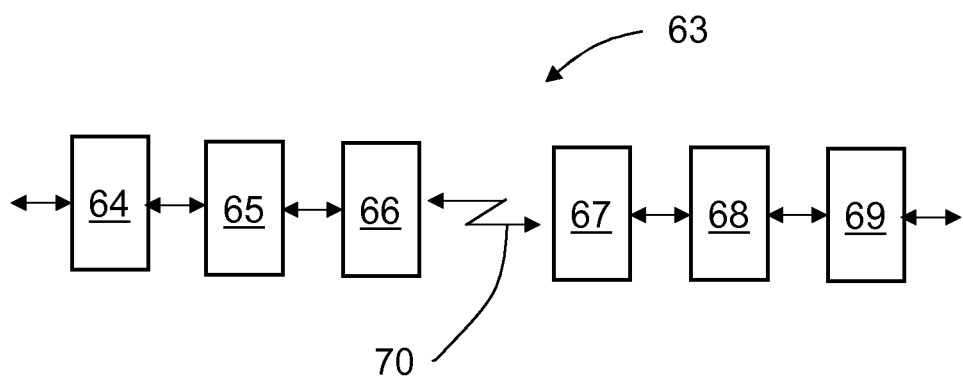
FIG. 5 shows a block diagram of a second application of fronthaul aggregation.

FIG. 4 and FIG. 5 show two applications of fronthaul aggregation. FIG. 4 exemplifies a system where multiple antenna signals 52 from a plurality of antennas 60, 61, 62 are forwarded over a microwave fronthaul link arrangement 53 by means of those resource elements containing important signals.

The fronthaul link arrangement 53 comprises a first fronthaul aggregation device 54, a first link antenna device 55, a second link antenna device 56, a second fronthaul aggregation device 57 and a CPRI connection 58 that is arranged to communicate the antenna signals to an eNodeB. Here, data is transferred between the first link antenna device 55 and the second link antenna device 56 via a fronthaul link 59. At the receiving end, the resource elements corresponding to each antenna 60, 61, 62 are re-assembled and enclosed in CPRI data.

FIG. 5 shows fronthaul aggregation implemented in the midst of a CPRI link arrangement 63 that comprises a first CPRI connection 64, a first fronthaul aggregation device 65, a first link antenna device 66, a second link antenna device 67, a second fronthaul aggregation device 68 and a second CPRI connection 69 that is arranged to communicate the antenna signals to an eNodeB. Here, data is transferred between the first link antenna device 66 and the second link antenna device 67 via a fronthaul link 70.

At the receiver of each side of the CPRI link arrangement 63, incoming CPRI data contains I and Q samples of multiple antenna signals that are forwarded over the fronthaul link 70 provided that the resource elements contains data. At the other side, all resource elements are re-assembled, and all channels are enclosed in the output CPRI. The fronthaul link 70 now constitutes a wireless CPRI link, and as long as all resource blocks that contains data are reassembled correctly and no resource elements are dropped, there is no signal degradation.

However, if the UE capacity, i.e. the number of used resource elements, grows above the designed capacity of the microwave fronthaul link, there will be a degradation in the end-to-end CPRI link performance. The drop function can be implemented in a number of ways, e.g. by dropping resource elements starting at one end of the frequency band, or randomly in the time-frequency matrix.

Figure 6:
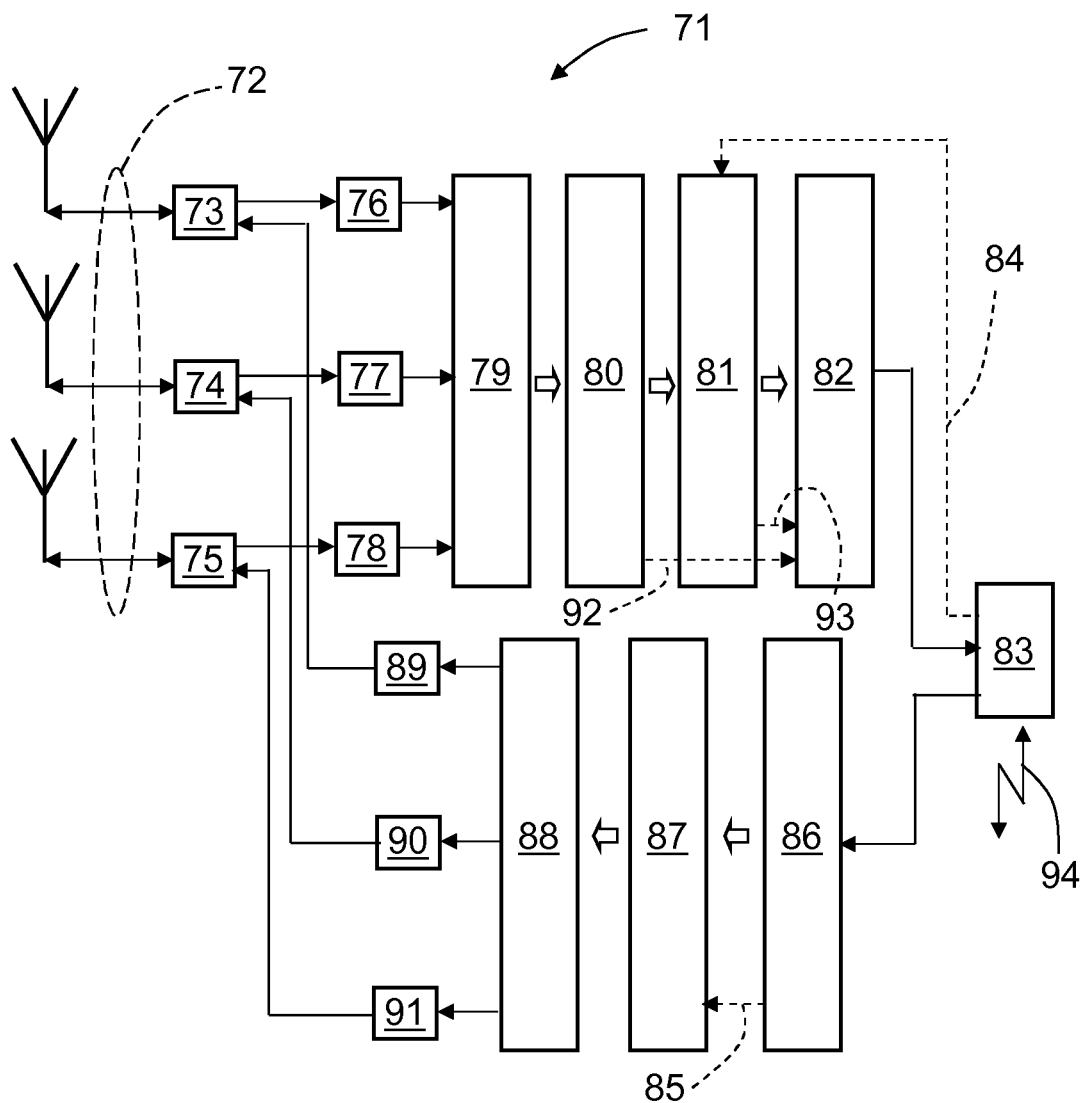
FIG. 6 shows the significant blocks of a block diagram of an aggregating fronthaul radio.

FIG. 6 shows the significant blocks of an aggregating fronthaul radio 71 in more detail, showing the implementation towards radio access antennas, but the important parts applies to the CPRI to CPRI version in FIG. 5 equally well by simply replacing the Radio parts with a CPRI frame assembly.

Starting at the receiver side; antenna signals 72 are fed into corresponding antenna diplexers 73, 74, 75. The output signals are demodulated and digitized into I and Q samples which in turn are arranged into OFDM symbols (assuming LTE) in corresponding receiver radio units 76, 77, 78. These samples and converted to frequency by means of an IFFT device 79 such that the time frequency matrix of FIG. 2 is accomplished. This process is well known since this is standardized by 3GPP and implemented in all eNodeBs.

Next, all resource blocks and resource elements are recovered in a first resource recovery unit 80, where the samples within all resource elements are compared to a threshold level or threshold pattern in order to judge if there is a signal present in the resource element or not. If a signal is present, all samples from that element are marked to be forwarded over the microwave fronthaul link 94 while if not, the samples belonging to this resource element are dropped and the position of the resource element in the radio frame is marked as empty.

When all elements in the radio frame are analyzed, the samples of the used resource elements are forwarded together with a list of used and non-used resource elements to a throttling block 81. The throttle block 81 is arranged to read the current capacity of the microwave fronthaul link 94 via a feedback connection 84 from a link antenna device 83, and compares this with the number of samples to be forwarded over the microwave fronthaul link 94 via a multiplexer unit 82 and the link antenna device 83. If the number of samples exceeds the current capacity, some resource elements must be dropped according to a predetermined strategy until the remaining samples fit the capacity of the microwave fronthaul link. According to some aspects, if dropping is required, the entire resource block is dropped since a resource block is the smallest entity that can be scheduled to a user anyway. Control connections 92, 93 run from the first resource recovery unit 80 and the throttling block 81 to the multiplexer unit 82.

It has been assumed that the whole radio frame was recovered before analyzing the resource elements. This may add significant latency, and in principle resource element recovery can be made on the fly once the overall radio frame synchronization is accomplished.

The lower part of FIG. 6 shows the significant blocks of the other side of the aggregating fronthaul link arrangement 71, i.e. after the samples have been forwarded over the microwave fronthaul link 94. The link antenna device 83 is connected to a de-multiplexer unit 86 and further to a resource recovery unit 87 which in turn is connected to an FFT device 88. The FFT device 88 is connected to transmitter radio units 89, 90, 91 which in turn are connected to the corresponding antenna diplexers 73, 74, 75. A control connection 85 runs from the de-multiplexer unit 86 to the resource recovery unit 87.

Samples forwarded over the microwave fronthaul link 94 are put back into the corresponding resource elements according to the list of used and non-used elements. The elements that were not used are reassembled with zeros or a low level value, and if some elements were dropped they can be filled with zeros or with a predetermined pattern to mark them as "dropped". This mark can potentially assist the eNodeB to understand what has happened to that data. It would also be beneficial to explicitly tell what resource blocks that were dropped due to the throttling or even better, request from the eNodeB what resource blocks to drop if needed. In this way it can be possible for the eNodeB to prioritize certain traffic. Finally, the samples are converted back to accomplish a time domain signal and the channels are delivered to the desired radio unit.

The block diagram in FIG. 6 corresponds to the concept of FIG. 4. If it instead is desired to accommodate a CPRI to CPRI link as illustrated in FIG. 5, the left part of FIG. 6, i.e. the radio and antennas, are simply replaced with a block that extracts and package the antenna signals and necessary O&M from/to CPRI frames.

With reference to FIG. 1, one challenge is now to determine whether a useful signal is present in an RE (resource element) or not. In the down-link this is trivial because the RE:s from the eNodeB 4 normally have relatively high SNR (signal to noise ratio) and thus an uncomplicated power threshold can be applied. However, in the uplink, the SNR in a single RE can be low or even negative. The integrated power over the RE can still be calculated and compared with a predetermined threshold value, but this is likely to lower the effective sensitivity of the radio base station and will cause UE:s 20, 21, 22 in poor condition to fail transmission. During poor SNR condition, an UE 20, 21, 22 will add redundancy and transmit the same information, using block coding, over multiple RE:s and thus the SNR in each RE can be very poor.

According to an aspect, the first wireless communication link arrangement 1 requires information from the eNodeB 4 regarding which RE:s that are used for uplink communication, something that is entirely scheduled by the eNodeB 4. Then fronthaul nodes such as the first node 3 can exactly know which RE:s to be forwarded or not. In order to enable such functionality, such scheduling information has to be made open to third party equipment. The CPRI fronthaul format can be used to signal information about used RE:s from the eNodeB 4 utilizing the proprietary part of the CPRI frames. Even more advantageously, the CPRI frame is standardized for such information to allow third party fronthaul links to access such information. Generally, this means that the first node 3 is arranged to determine that a data block 6 contains information by acquiring information from another node in the first wireless communication link arrangement 1 regarding which data blocks that are intended to carry information. Such information may also be available from other nodes, or more general other network devices, such as one or more remote cloud units 95. This is indicated in FIG. 1, where a remote cloud unit 95 is connected to both the first wireless communication link arrangement 1 and the second wireless communication link arrangement 2.

In this context, a remote cloud unit 95 is constituted by an accessible remote control device, such as an Internet server or similar, having a predefined suitable functionality. There may be more than one cloud unit 95, here only one is indicated. The nodes and remote control devices are generally referred to as network devices.

Generally, the present disclosure relates to a wireless communication link arrangement 1, 2 comprising a first network device 3 and a second network device 4, 5. The wireless communication link arrangement 1, 2 is arranged for transfer of fronthaul data between the first network device 3 and the second network device 4, 5 via a wireless communication fronthaul link 10, 11; 23, 24, 26. Each of said network devices 3, 4, 5 is arranged to constitute a transmitting network device and/or a receiving network device. At least one network device 3, 4, 5; 95, that does not have to be one of the said network devices 3, 4, 5, is arranged to determine the present load on the wireless communication link arrangement 1, 2. When the present load is determined to exceed a first threshold, at least one network device 3, 4, 5, 7; 95 comprised in the wireless communication link arrangement 1, 2, but does not have to be one of the said network devices 3, 4, 5, is arranged to determine whether data blocks 6 that are intended to be transmitted by a transmitting network device 3, 4, 5 contain information or not, and to instruct said transmitting network device 3, 4, 5 to only transmit data blocks 6 that have been determined to contain information.

The transmitting network device and/or receiving network device are thus constituted by at least one of said first network device 3 and said second network device 4, 5. The network device that is arranged to determine the present load on the wireless communication link arrangement 1, 2, and/or the at least one network device that is arranged to determine whether data blocks 6 that are intended to be transmitted by a transmitting network device 3, 4, 5 contain information or not, may either be constituted by at least one of said first network device 3 and second network device 4, 5, or another network device such as a remote cloud units 95.

According to another aspect, as shown in FIG. 1, another node 7, for example a simplified eNodeB, is used in at least one of the fronthaul nodes and is arranged to analyze the traffic between a UE and a real node in order to estimate either RE scheduling and/or what code the UE uses during poor SNR condition.

More in detail, the third UE 22 communicates with the first RRU 3 via the fourth wireless communication link 26. The simplified eNodeB 7 is then arranged to analyze the traffic between the third UE and first RRU 3, and to forward the extracted information either to the first RRU 3 or to the eNodeB 4, or both. It is also conceivable that the simplified eNodeB 7 is arranged to forward the extracted information to any network device, also a remote cloud unit 95.

Generally, this means that a network device 3, 4, 5; 95 is arranged to determine that a data block contains information by acquiring information from another network device 7, 95 regarding present data traffic conditions.

Many node functionalities may completely or partly be outsourced to cloud units 95, for example determining the present load on the wireless communication link arrangement and determining whether RE:s 6 that are intended to be transmitted contain information or not.

The preferred RE forwarding decision method will depend on the actual fronthaul scenario. In some scenarios such as fronthauling of small cells or indoor cells, the SNR from a UE at the RAU will be rather high, and the uncomplicated power threshold method will work fine, while fronthauling a big macro site may require forwarding of RE:s with even negative SNR.

According to some aspects, all RE:s belonging to the Physical Random Access Channel (PRACH) are always forwarded since non-synchronized UE:s transmit here in order to join the LTE cell.

Figure 7:
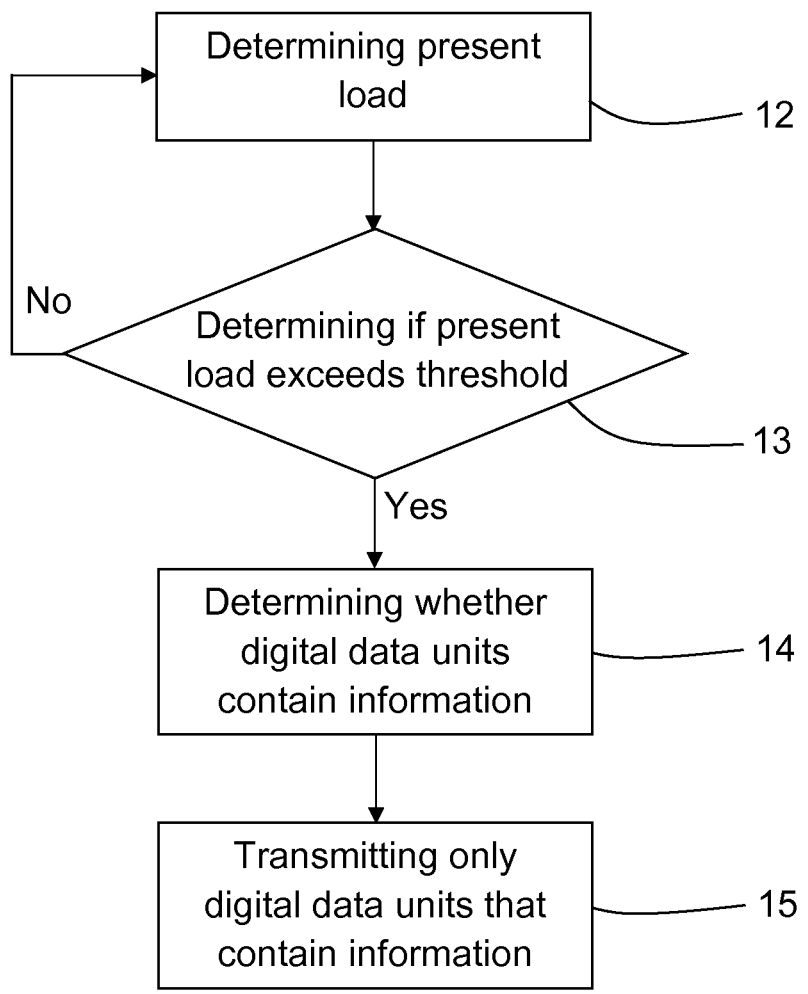
FIG. 7 shows a flowchart for a method according to the present disclosure.

With reference to FIG. 7, the present disclosure also relates to a method for adaptively maintaining a wireless communication fronthaul link 10, 11 that is used for transfer of fronthaul data between a first network device/node 3 and a second network device/node 4, 5, where the method comprises:

12: Determining the present load on the wireless communication link 10, 11.

13: Determining if the present load exceeds a first threshold; and if that is the case:

14: Determining whether data blocks 6 that are intended to be transmitted contain information or not.

15: Transmitting only data blocks (6) that have been determined to contain information.

The present disclosure is not limited to the examples above, but may vary within the scope of the appended claims. For example, the first node and the second node may be other types of nodes that communicate via a wireless communication fronthaul link, such as for example vehicles and street lights. As mentioned previously, generally, the nodes as well as remote control functionalities like remote cloud units constitute network devices.

All examples are to be regarded as reciprocal, i.e. working in both way regarding transmission and reception.

Some examples are related to CPRI links, but other types of wireless microwave communication fronthaul links are also conceivable.

In the block diagrams, all elements are not shown, these block diagrams being intended to provide an understanding for the present disclosure. Some blocks are furthermore only briefly mentioned, the functionalities being well-known in the art.

Generally, the present disclosure relates to a wireless communication link arrangement 1, 2 comprising a first network device 3 and a second network device 4, 5, where the wireless communication link arrangement 1, 2 is arranged for transfer of fronthaul data between the first network device 3 and the second network device 4, 5 via a wireless communication fronthaul link 10, 11; 23, 24, 26 where each of said network devices 3, 4, 5 is arranged to constitute a transmitting network device and/or a receiving network device, where at least one network device 3, 4, 5; 95 is arranged to determine the present load on the wireless communication link arrangement 1, 2, wherein, when the present load is determined to exceed a first threshold, at least one network device 3, 4, 5, 7; 95 comprised in the wireless communication link arrangement 1, 2, is arranged to determine whether data blocks 6 that are intended to be transmitted by a transmitting network device 3, 4, 5 contain information or not, and to instruct said transmitting network device 3, 4, 5 to only transmit data blocks 6 that have been determined to contain information.

According to an example, at least one of said network devices 3, 4, 5; 95 is arranged to determine that a data block 6 contains information if it has a power level that is determined to exceed a second threshold.

According to an example, at least one of said network devices 3, 4, 5; 95 is arranged to determine whether a data block 6 contains information by acquiring information from another network device 3, 4, 5; 95 in the wireless communication link arrangement 1 regarding which data blocks that are intended to carry information.

According to an example, at least one of said network devices 3, 4, 5; 95 is arranged to determine whether a data block contains information by acquiring information from another network device 7, 95 regarding present data traffic conditions.

According to an example, said data traffic conditions comprises data unit scheduling and data unit coding when a Signal to Noise Ratio, SNR, has been determined to fall below a third threshold According to an example, the data blocks are in the form of resource elements 6.

According to an example, a plurality of resource elements 6 are comprised in a resource block 8, where a plurality of resource blocks 8 are comprised in a radio frame 9.

According to an example, the first network device 3 is a first Remote Radio Unit (RRU) and where the second network device either is a second RRU 5 or an eNodeB 4.

According to an example, said network devices 3, 4, 5; 95 are constituted by at least one of:
 a communication node 3, 4, 5; 7;
 at least one remote control functionality 95.

Generally, the present disclosure also relates to a method for adaptively maintaining a wireless communication fronthaul link 10, 11 that is used for transfer of fronthaul data between a first network device 3 and a second network device 4, 5, where the method comprises:
 12: determining the present load on the wireless communication link 10, 11, wherein the method further comprises:
 13: determining if the present load exceeds a first threshold; and if that is the case;
 14: determining whether data blocks 6 that are intended to be transmitted contain information or not; and
 15: transmitting only data blocks 6 that have been determined to contain information.

According to an example, a data block 6 is determined to contain information if it has a power level that is determined to exceed a second threshold.

According to an example, the method comprises acquiring information regarding which data blocks that are intended to carry information when determining whether a data block 6 contains information.

According to an example, the method comprises acquiring information regarding present data traffic conditions for determining whether a data block 6 contains information.

According to an example, said data traffic conditions uses data unit scheduling and data unit coding when a Signal to Noise Ratio, SNR, has been determined to fall below a third threshold According to an example, the data blocks are in the form of resource elements 6.

According to an example, a plurality of resource elements 6 are comprised in a resource block 8, where a plurality of resource blocks 8 are comprised in a radio frame 9.

According to an example, the first network device 3 is a first Remote Radio Unit (RRU) and where the second network device either is a second RRU 5 or an eNodeB 4.

Figure 8:
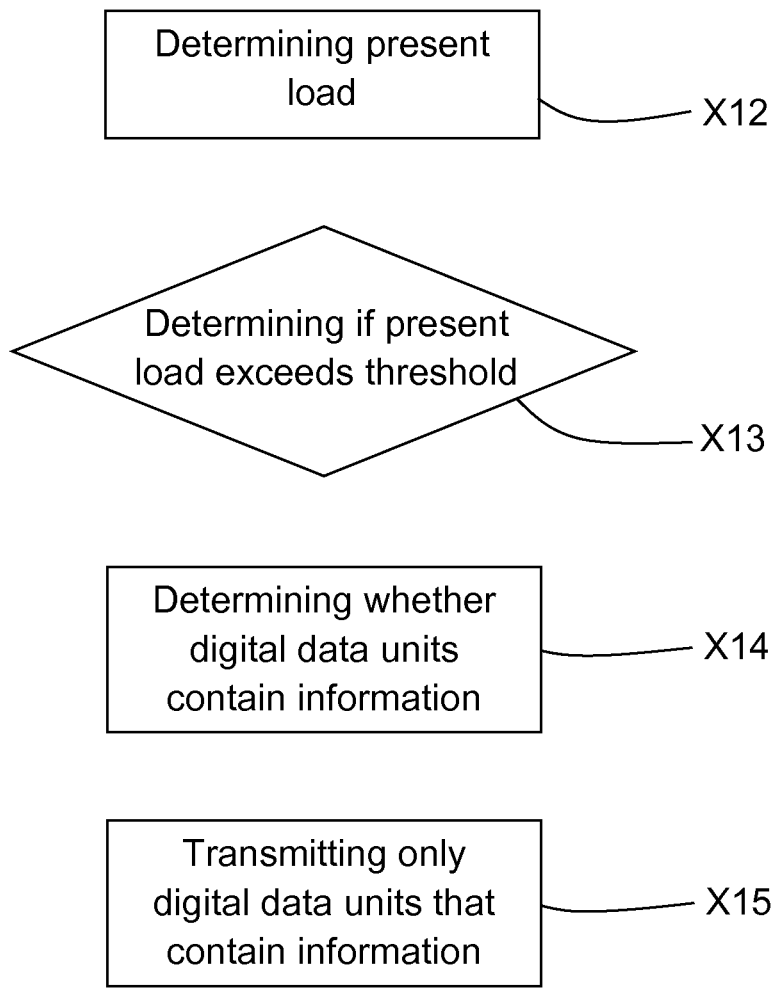
FIG. 8 illustrates a wireless communication link arrangement according to some aspects of the present disclosure.

FIG. 8 shows a wireless communication fronthaul link arrangement for adaptively maintaining a wireless communication fronthaul link 10, 11 that is used for transfer of fronthaul data between a first network device/node 3 and a second network device/node 4, 5. The wireless communication fronthaul link arrangement comprises:
 A first determining module X12 configured to determine the present load on the wireless communication link 10, 11.
 A second determining module X13 configured to determine if the present load exceeds a first threshold.
 A third determining module X14 configured to determine whether data blocks 6 that are intended to be transmitted contain information or not, provided the present load exceeds said first threshold.
 A transmitting module X15 configured to transmit only data blocks (6) that have been determined to contain information.

The invention claimed is:

1. A wireless communication link arrangement, comprising:
 a first network device; and
 a second network device,
 wherein the wireless communication link arrangement is arranged for transfer of fronthaul data between the first network device and the second network device via a wireless communication fronthaul link,
 wherein each of said first network device and second network device is arranged to constitute at least one of a transmitting network device and a receiving network device, and
 wherein at least one of said first network device, said second network device, and a third network device comprised in the wireless communication link arrangement is arranged to:
 determine a present load on the wireless communication link arrangement;
 determine whether the present load exceeds a first threshold;
 when the present load is determined to exceed the first threshold, determine whether a first set of data blocks that are intended to be transmitted by said transmitting network device contain first information or not,
 wherein at least one of said first network device, said second network device, and said third network device is arranged to determine whether a data block of said first set of data blocks contains the first information by acquiring second information regarding which of the first set of data blocks are intended to carry the first information, and wherein the second information is acquired from a fourth network device in the wireless communication link arrangement; and
 instruct said transmitting network device to only transmit a second set of data blocks, out of the first set of data blocks, that have been determined to contain the first information.

2. The wireless communication link arrangement according to claim 1, wherein at least one of said first network device, said second network devices and said third network device is arranged to determine that a data block of said first set of data blocks contains the first information when the data block has a power level that is determined to exceed a second threshold.

3. The wireless communication link arrangement according claim 1, wherein at least one of said first network device, said second network device, and said third network device is arranged to determine whether a data block of said first set of data blocks contains the first information by acquiring second information regarding present data traffic conditions and wherein the second information is acquired from a fourth network device in the wireless communication link arrangement.

4. The wireless communication link arrangement according to claim 3, wherein said present data traffic conditions comprise data unit scheduling and data unit coding when a Signal to Noise Ratio (SNR) has been determined to fall below a second threshold.

5. The wireless communication link arrangement according to claim 1, wherein the first set of data blocks is in the form of resource elements.

6. The wireless communication link arrangement according to claim 5,
wherein a plurality of resource elements is comprised in a resource block, and
wherein a plurality of resource blocks is comprised in a radio frame.

7. The wireless communication link arrangement according to claim 1,
wherein the first network device is a first Remote Radio Unit (RRU), and
wherein the second network device is either a second RRU or an eNodeB.

8. The wireless communication link arrangement according to claim 1, wherein each of said first network device, said second network device, and said third network device is constituted by at least one of:
a communication node; and
at least one remote control functionality.

9. A method for adaptively maintaining a wireless communication fronthaul link that is used for transfer of fronthaul data between a first network device and a second network device, wherein the method comprises:
determining a present load on the wireless communication fronthaul link;
determining whether the present load exceeds a first threshold;
when the present load exceeds the first threshold, determining whether a first set of data blocks that are intended to be transmitted contain first information or not,
wherein at least one of said first network device, said second network device, and said third network device is arranged to determine whether a data block of said first set of data blocks contains the first information by acquiring second information regarding which of the first set of data blocks are intended to carry the first information, and wherein the second information is acquired from a fourth network device in the wireless communication link arrangement; and
transmitting only a second set of data blocks, out of the first set of data blocks, that have been determined to contain the first information.

10. The method according to claim 9, wherein a data block of the first set of data blocks is determined to contain the first information when the data block has a power level that is determined to exceed a second threshold.

11. The method according to claim 9, wherein the method further comprises acquiring second information regarding which of the first set of data blocks are intended to carry the first information when determining whether a data block of the first set of data blocks contains the first information.

12. The method according to claim 9, wherein the method further comprises acquiring second information regarding present data traffic conditions for determining whether a data block of the first set of data blocks contains the first information.

13. The method according to claim 12, wherein said present data traffic conditions uses data unit scheduling and data unit coding when a Signal to Noise Ratio (SNR) has been determined to fall below a second threshold.

14. The method according to claim 9, wherein the data blocks is in the form of resource elements.

15. The method according to claim 14,
wherein a plurality of resource elements is comprised in a resource block, and
wherein a plurality of resource blocks is comprised in a radio frame.

16. The method according to claim 9,
wherein the first network device is a first Remote Radio Unit (RRU), and
wherein the second network device is either a second RRU or an eNodeB.

17. The method according to claim 9, wherein a data block of the first set of data blocks is not transmitted when the data block has a total power level that is below a certain threshold level.

* * * * *